(12) United States Patent
Mizutani et al.

(10) Patent No.: US 10,434,387 B2
(45) Date of Patent: Oct. 8, 2019

(54) GOLF CLUB

(71) Applicant: SUMITOMO RUBBER INDUSTRIES, LTD., Hyogo (JP)

(72) Inventors: Naruhiro Mizutani, Kobe (JP); Seiji Hayase, Kobe (JP); Kenji Takasu, Kobe (JP); Takashi Nakano, Kobe (JP); Daisuke Kohno, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/028,523

(22) Filed: Jul. 6, 2018

(65) Prior Publication Data

US 2019/0009150 A1   Jan. 10, 2019

(30) Foreign Application Priority Data

Jul. 10, 2017   (JP) ................. 2017-134371

(51) Int. Cl.
| | | |
|---|---|---|
| A63B 53/00 | (2015.01) | |
| A63B 53/10 | (2015.01) | |
| A63B 53/08 | (2015.01) | |
| A63B 53/04 | (2015.01) | |
| B29K 307/04 | (2006.01) | |
| A63B 60/42 | (2015.01) | |
| A63B 60/00 | (2015.01) | |
| B29C 70/32 | (2006.01) | |
| B29L 31/52 | (2006.01) | |
| B29K 105/08 | (2006.01) | |
| A63B 102/32 | (2015.01) | |

(52) U.S. Cl.
CPC .............. *A63B 53/10* (2013.01); *A63B 53/08* (2013.01); *A63B 53/047* (2013.01); *A63B 53/0466* (2013.01); *A63B 53/0487* (2013.01); *A63B 60/42* (2015.10); *A63B 2060/002* (2015.10); *A63B 2102/32* (2015.10); *A63B 2209/023* (2013.01); *B29C 70/32* (2013.01); *B29K 2105/0881* (2013.01); *B29K 2307/04* (2013.01); *B29L 2031/5227* (2013.01)

(58) Field of Classification Search
USPC .................................................. 473/282–323
See application file for complete search history.

(56) References Cited

U.S. PATENT DOCUMENTS

| | | | | | |
|---|---|---|---|---|---|
| 4,203,598 | A | * | 5/1980 | Stuff ....................... | A63B 60/24 473/287 |
| 5,467,984 | A | * | 11/1995 | Veux ....................... | A63B 53/00 473/291 |
| 7,416,495 | B2 | * | 8/2008 | Ban ......................... | A63B 53/00 473/292 |
| 8,858,355 | B2 | * | 10/2014 | Nakamura .............. | A63B 53/00 473/292 |

FOREIGN PATENT DOCUMENTS

| | | |
|---|---|---|
| JP | 2001-149510 A | 6/2001 |
| JP | 2004-201911 A | 7/2004 |

* cited by examiner

*Primary Examiner* — Alvin A Hunter
(74) *Attorney, Agent, or Firm* — Studebaker & Brackett PC

(57) ABSTRACT

A golf club includes a head, a shaft, and a grip. The golf club has a club vibration frequency of less than or equal to 210 cpm. The golf club has a swing weight of greater than or equal to D5. With the golf club, a force acting on the player's body during a swing can be reduced. The golf club can stabilize swing.

11 Claims, 5 Drawing Sheets

GOLF CLUB

This application claims priority on Patent Application No. 2017-134371 filed in JAPAN on Jul. 10, 2017. The entire contents of this Japanese Patent Application are hereby incorporated by reference.

BACKGROUND OF THE INVENTION

Field of the Invention

The present invention relates to golf clubs.

Description of the Related Art

Golf clubs that are intended to improve the directional stability of a hit ball and the like are known. JP2001-149510 discloses a golf club having a real loft of 11° or less and a club vibration frequency of 240 cpm or less, and in which the real loft and the club vibration frequency have a predetermined relationship. JP2004-201911 discloses a golf club having a total weight of 285 g or less, a club length of 111 cm or greater, and in which the proportion of the weight of the head to the total weight of the golf club is greater than or equal to 73% and less than or equal to 81%.

SUMMARY OF THE INVENTION

The present inventors have conducted intensive studies on further improvement of golf clubs. As a result, the inventors have gained new finding about the influence of a golf club on swing stability.

It is an object of the present disclosure to provide a golf club that can increase swing stability.

In one aspect, a golf club includes a head, a shaft, and a grip. A club vibration frequency may be less than or equal to 210 cpm. A swing weight may be greater than or equal to D5

In another aspect, a grip weight Wg may be less than or equal to 30 g.

When a weight of the head is denoted by Wh, and a weight of the club is denoted by Wc, Wh/Wc may be greater than or equal to 0.72.

In another aspect, a club length of the golf club may be greater than or equal to 45.7 inches and less than or equal to 46.5 inches.

A distance between a butt-side end of the grip and a center of gravity of the grip is denoted by Lg1, and a length of the grip is denoted by Lg2. In another aspect, Lg1/Lg2 may be greater than or equal to 0.37.

In another aspect, a shoulder center grip GLL calculated by Equation (1) below may be less than or equal to 140 kg·cm$^2$:

$$\text{Shoulder center grip } GLL = Wg \times L \times L \quad (1)$$

where Wg is a weight (kg) of the grip, and L is a value calculated by Equation (2) below:

$$L = [60^2 + (Lg1)^2]^{1/2} \quad (2)$$

where Lg1 is the distance (cm) between the butt-side end of the grip and the center of gravity of the grip.

DESCRIPTION OF THE PREFERRED EMBODIMENTS

The following will describe preferred embodiments in detail with appropriate reference to the drawings.

In the present application, the "axial direction" means the axial direction of a straight shaft that is not bent.

Figure 1:
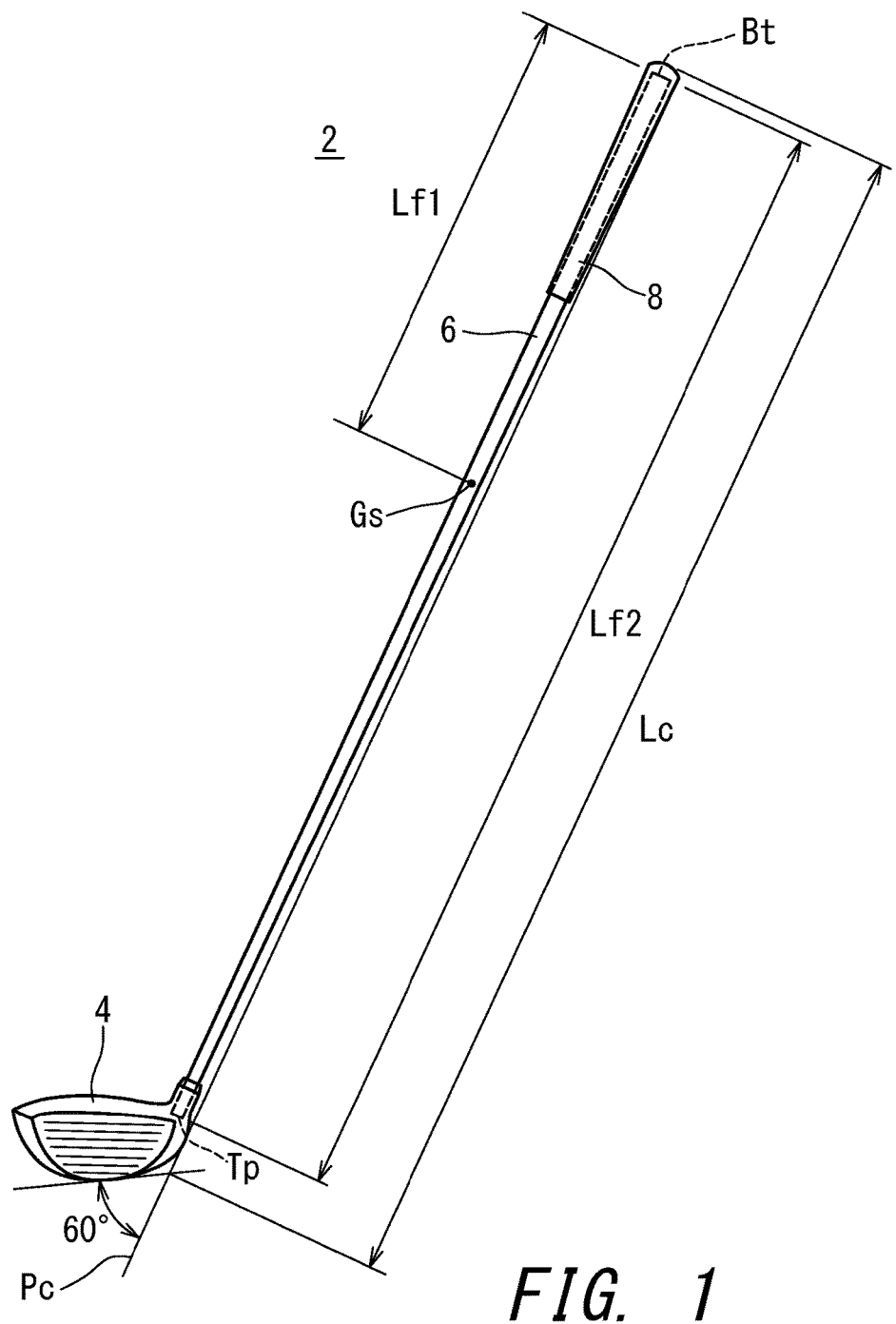
FIG. 1 shows a golf club according to one embodiment.

FIG. 1 shows a golf club 2 according to one embodiment. The golf club 2 includes a head 4, a shaft 6, and a grip 8. The head 4 is attached to a tip portion of the shaft 6. The grip 8 is attached to a butt portion of the shaft 6.

The golf club 2 exhibits excellent flight distance performance. The golf club 2 is a driver (No. 1 wood). Normally, the club length of the driver is greater than or equal to 43 inches. Preferably, the golf club 2 is a wood type golf club.

The club 2 has a club weight Wc.

A double-ended arrow Lc in FIG. 1 indicates a club length. A measurement method for the club length Lc will be described later.

In the present embodiment, the head 4 has a hollow structure. The head 4 is a wood type head. The head 4 may be a hybrid type (utility type) head. The head 4 may be an iron type head. The head 4 may be a putter type head. Examples of the material of the head 4 include a metal and a fiber reinforced plastic. Examples of the metal include a titanium alloy, pure titanium, stainless steel, and soft iron. Examples of the fiber reinforced plastic include carbon fiber reinforced plastic.

The head 4 has a head weight Wh.

The shaft 6 is formed by a laminate of fiber-reinforced resin layers. The shaft 6 is a tubular body. The shaft 6 has a hollow structure. As shown in FIG. 1, the shaft 6 has a tip end Tp and a butt end Bt. The tip end Tp is located inside the head 4. The butt end Bt is located inside the grip 8.

The shaft 6 has a shaft weight Ws.

A double-ended arrow Lf2 in FIG. 1 indicates a shaft length. The shaft length Lf2 is an axial-direction distance between the tip end Tp and the butt end Bt. A double-ended arrow Lf1 in FIG. 1 indicates an axial-direction distance between the butt end Bt and a center of gravity Gs of the shaft. The center of gravity Gs of the shaft is the center of gravity of the shaft 6 alone. The center of gravity Gs is located on an axis line of the shaft.

The shaft 6 is a so-called carbon shaft. Preferably, the shaft 6 is formed by curing a prepreg sheet. In the prepreg sheet, fibers are oriented substantially in one direction. A prepreg in which fibers are oriented substantially in one direction is also referred to as UD prepreg. "UD" is an abbreviation for unidirectional. A prepreg other than the UD prepreg may also be used. For example, fibers contained in the prepreg sheet may be woven.

The prepreg sheet includes fibers and a resin. The resin is also referred to as a matrix resin. Typically, the fibers are carbon fibers. Typically, the matrix resin is a thermosetting resin.

The shaft 6 is produced by a so-called sheet winding method. In the prepreg, the matrix resin is in a semi-cured state. The shaft 6 is formed by winding and curing the prepreg sheet.

Not only an epoxy resin but also a thermosetting resin other than the epoxy resin, a thermoplastic resin, etc. may be used as the matrix resin of the prepreg sheet. From the viewpoint of the shaft strength, the matrix resin is preferably the epoxy resin.

The production method for the shaft 6 is not limited. From the viewpoint of the degree of freedom in design, a shaft produced by the sheet winding method is preferable. The material of the shaft 6 is not limited. The shaft 6 may be a steel shaft, for example.

The grip 8 is a portion that is gripped by a golf player during a swing. The grip 8 has a grip weight Wg.

Examples of the material of the grip 8 include a rubber composition and a resin composition. Examples of the rubber in the rubber composition include natural rubber (NR), ethylene propylene diene monomer (EPDM) rubber, styrene butadiene rubber (SBR), isoprene rubber (IR), butadiene rubber (BR), chloroprene rubber (CR), and acrylonitrile butadiene rubber (NBR). In particular, natural rubber, or a material obtained by blending (mixing) natural rubber with a rubber having good affinity for natural rubber, such as ethylene propylene diene rubber, styrene butadiene rubber, or the like, is preferable. Examples of the resin contained in the resin composition include a thermoplastic resin. The thermoplastic resin can be used for injection forming. As the thermoplastic resin, a thermoplastic elastomer is preferable, and a thermoplastic elastomer including a soft segment and a hard segment is more preferable. From the viewpoint of achieving both desired gripping property and desired abrasion resistance, a urethane thermoplastic elastomer is more preferable.

The rubber composition of the grip 8 may be a foamed rubber. A foaming agent may be included in the foamed rubber. One example of the foaming agent is a thermal decomposition type foaming agent. Examples of the thermal decomposition type foaming agent include azo compounds such as azodicarbonamide, nitroso compounds such as dinitrosopentamethylenetetramine, and triazole compounds. The foamed rubber contributes to weight reduction of the grip 8.

A plurality of types of rubbers having different expansion ratios may be used. The plurality of types of rubbers having different expansion ratios can include an un-foamed rubber (having an expansion ratio of zero). By adjusting the arrangement of the plurality of types of rubbers, a position of a center of gravity Gg (described later) of the grip can be adjusted.

The production method for the grip 8 is not limited. The grip 8 can be produced by a known production method. Examples of the production method include press forming and injection forming.

In the case where a plurality of types of rubbers having different expansion ratios are used, the press forming is preferable. In this case, a rubber sheet 1 made of a material to be formed at a first expansion ratio and a rubber sheet 2 made of a material to be formed at a second expansion ratio are prepared, for example. Each of these sheets is placed at a given position inside a mold, and heated and pressed, thereby performing press forming. This method allows each of the rubbers having different expansion ratios to be freely disposed.

[1. Relationship Between Force F Acting on Human Body During Swing and Swing Stability]

On the basis of a new viewpoint, the present inventors have investigated possible improvements in a golf club. As a result, a relationship between swing and a golf club, not only a golf club itself, has come to the inventors' attention. Then, the inventors have found that a force F acting on the human body during a swing can destabilize the swing, and that the force F can be controlled by specifications of the golf club. In addition, it has been found that not only movement of the club but also movement of arms need taking into consideration for analyzing the force F.

[1-1. Force F Acting on Human Body During Swing]

Figure 2:
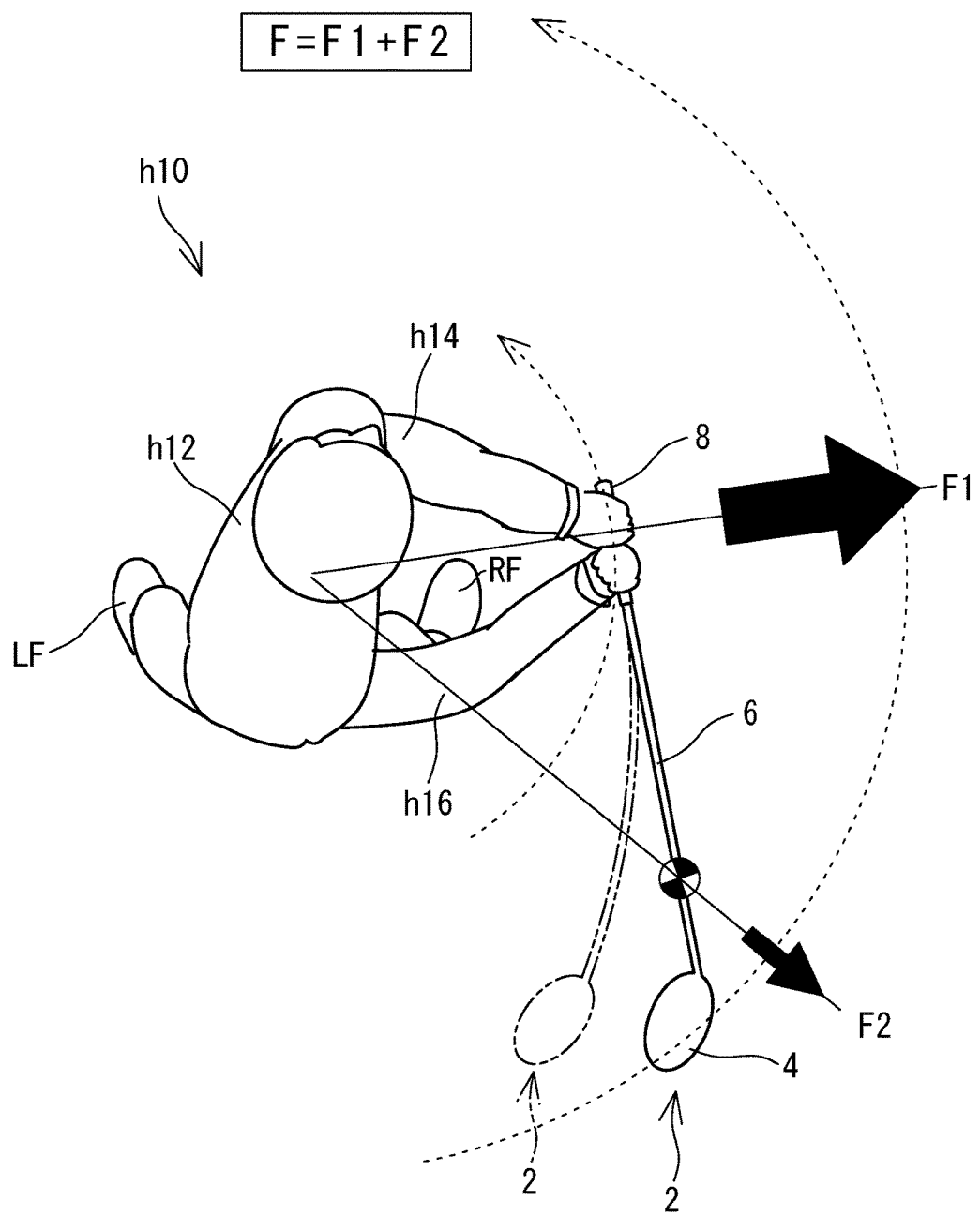
FIG. 2 is a view of a golf player during a swing, as viewed from above, in which forces acting on the player's body during downswing are indicated by arrows.

FIG. 2 shows a golf player during a swing, as viewed from above. FIG. 2 shows a state in the initial stage of downswing, near a top of the swing. The top of the swing may also be simply referred to as "top".

A swing is considered to be a rotary motion about the center of a human body h10 as a swing axis. Practically, the center of the human body h10 is a trunk h12. During a swing, the golf club 2 rotates, and arms (a left arm h14 and a right arm h16) also rotate simultaneously therewith. A centrifugal force F1 of the arms and a centrifugal force F2 of the club act on the center (trunk h12) of the human body h10. The force F can be considered as substantially the sum total of the centrifugal force F1 of the arms and the centrifugal force F2 of the club.

In a normal golf swing, the centrifugal force F1 of the arms in downswing is larger than the centrifugal force F2 of the club (see FIG. 2). The reason is that the weight of the arms is significantly larger than the weight of the club 2. Whereas the club weight is approximately 0.2 to 0.5 kg, the total weight of the two arms is approximately 6 kg even for a person who weighs 50 kg. In many phases during downswing, the club 2 is located further away from the swing axis than the arms, and the rotation speed of the club 2 is higher than the rotation speed of the arms. Due to the significant weight difference, however, the centrifugal force F1 of the arms is larger than the centrifugal force F2 of the club. As a result of studies on swing, the present inventors have found that the centrifugal force of the club is approximately 200 to 300 N, whereas the centrifugal force of the arms is approximately 400 N.

[1-2. Relationship Between Force F and Balance of Human Body]

Figure 3:
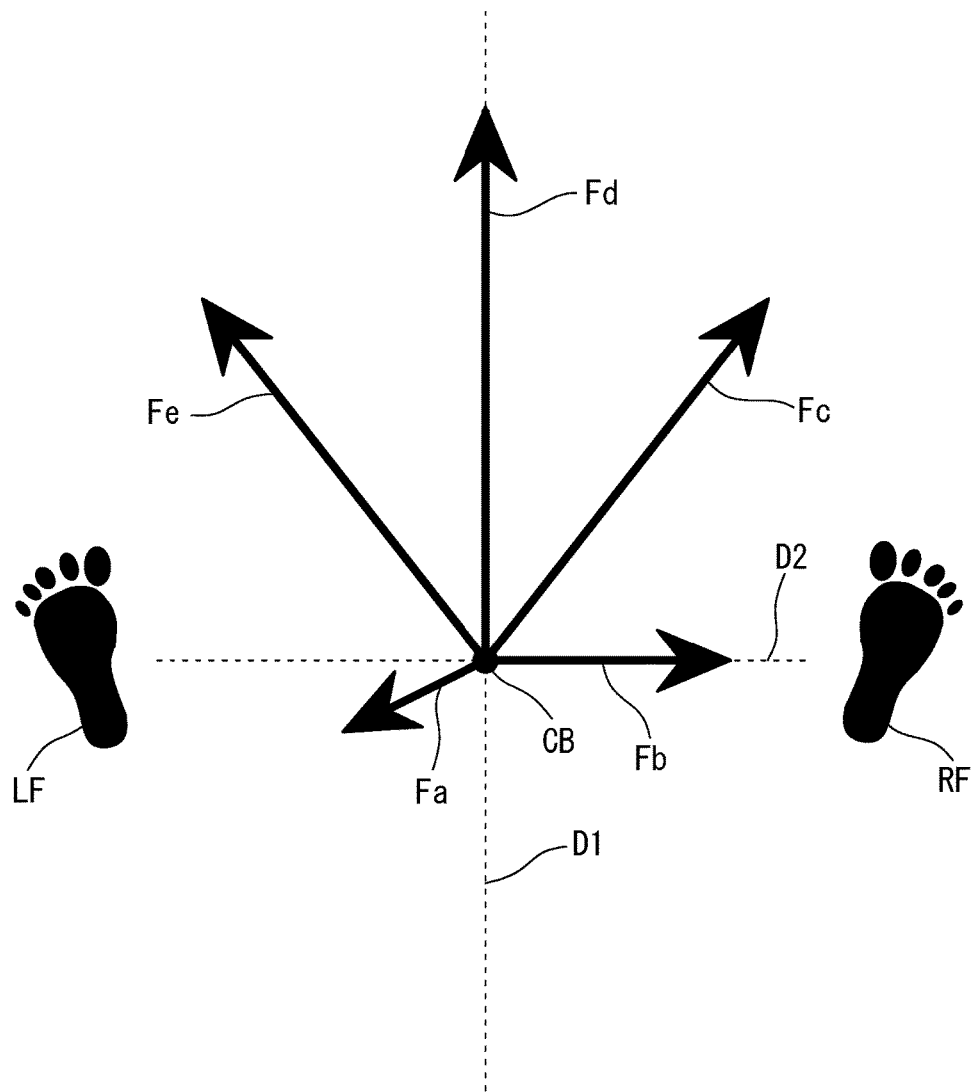
FIG. 3 is a conceptual diagram showing forces acting on the player's body in various phases of a swing.

FIG. 3 is a schematic diagram showing the positions of both feet during a swing. In the human body during a swing, a front-rear direction D1 and a hitting direction D2 are defined. The front-rear direction D1 is a direction connecting the front and the rear of the human body. The hitting direction D2 is a direction connecting the position of a ball and a target. The directions D1 and D2 are parallel to the ground.

During a swing, the human body h10 tries to maintain balance using the left foot LF and the right foot RF. However, this balance can be disturbed by the force F acting on the human body during the swing. When the balance has been disturbed, the distance between the ball and the swing axis changes. As a result, the hitting point varies. This variation in hitting points causes variation in hitting results. The hitting results are the flight distance of a hit ball, the direction of the hit ball, the launch angle, the amount of spin, and the trajectory, for example. Furthermore, the disturbance of the balance causes the swing axis to be displaced, thus impeding a smooth swing. The balance is important.

The left foot LF and the right foot RF are disposed along the hitting direction D2. In other words, the human body h10 is in contact with the ground at two different positions in the direction D2. Accordingly, the balance is relatively less likely to be disturbed by a force acting along the hitting direction D2. On the other hand, the balance is likely to be disturbed by a force acting along the front-rear direction D1. In particular, the human body h10 tends to reel when pulled to the front side.

FIG. 3 shows force F acting on a center CB of the human body at various time points from downswing to impact. FIG. 3 shows an example for a conventional golf club. As the force F, a force Fa acting at the time of a turn, a force Fb acting in the first half of the downswing, a force Fc acting at a midpoint of the downswing, a force Fd acting immediately before impact, and a force Fe acting at impact are shown. In the initial stage of downswing, the rotation speeds of the arms and the club 2 are low, and the force F is small (see Fa and Fb). From the latter half of the downswing to the impact, the rotation speeds of the arms and the club 2 increase, and the force F is large (see Fc, Fd, and Fe).

In a phase near the impact, the club 2 and the arms are located in front of the human body h10, and a wrist cock is released, so that the club 2 is moved away from the human body h10. Accordingly, a large force F acts toward the front side. That is, in the phase near the impact, the front-rear direction component of the force F is large (see Fc, Fd, and Fe). As described above, the force pulling the human body h10 to the front side tends to disturb the balance of the human body h10. If the force pulling to the front side can be reduced, the balance (posture) of the human body h10 is likely to be maintained. If the balance of the human body h10 can be stabilized, the displacement of the swing axis can be suppressed, thus reducing the variation in hitting points.

[2. Club that can Reduce Force F]

On the basis of the above-described analysis, the present inventors have investigated about a club that can reduce the force F.

The distance between the trunk h12 and the center of gravity of the club 2 changes during a swing. A cause of this change is bending of the shaft 6 (see the dashed double-dotted line in FIG. 2). Depending on the degree of bending of the shaft 6, the distance between the club 2 and the swing axis (trunk h12) changes. As this distance is decreased, the moment of inertia of the club 2 about the swing axis is decreased.

The time at which a swing transitions from top to downswing is also referred to as a turn from top. At the turn from top, the shaft 6 can bend as a result of a force of inertia of the head 4 being exerted when the advancing direction of a swing is reversed. This bending of the shaft 6 is bending such that the head 4 is delayed in the advancing direction of downswing (see the club 2 indicated by the dashed double-dotted line in FIG. 2). In the present application, this bending in the initial stage of downswing is also referred to as "initial bending".

The initial bending is bending in a direction in which the center of gravity of the club 2 approaches the human body h10. When the initial bending is large, the center of gravity of the club 2 approaches the above-described center of rotation, so that the moment of inertia of the club 2 about the swing axis is decreased. Conversely, when this bending is small, the center of gravity of the club 2 is farther from the swing axis than when the bending is large. As a result, the moment of inertia of the club 2 about the swing axis is increased.

When the initial bending is large, the path of the head 4 approaches the trunk h12. In other words, the path of the head 4 approaches the swing axis. As a result, in the first half of the downswing, the moment of inertia of the club 2 about the swing axis is decreased, and the rotation speed of the arms is increased (arm speed increasing effect A). This rotational energy is transmitted to the club 2, so that the head 4 is accelerated.

For the club 2 whose head 4 has been accelerated, the centrifugal force of the club 2 with respect to the swing axis is increased, thus promoting the rotation of the club 2 about the center of gravity of the club 2. Due to this rotary motion, the grip 8, which is located on the opposite side to the head 4, tends to move in the direction opposite to the advancing direction of the downswing. However, since the grip 8 is restrained by the arms, a force in a direction in which the arms are decelerated is generated in the grip 8. As a result, the movement of the arms of the human body h10 is slowed, whereas the head 2 moves fast. That is, in the latter half of the downswing, the head 2 is accelerated, and the rotation speed of the arms is decreased (arm speed reducing effect).

Thus, increasing the initial bending increases the head speed near impact, and also decreases the rotation speed of the arms near impact. In this case, the force F, which is substantially the sum of the centrifugal force F1 of the arms and the centrifugal force F2 of the club, is decreased. The reason is that the weight of the arms is larger than the weight of the club 2 as described above. Accordingly, the amount of decrease in the centrifugal force F1 resulting from the slowing of the rotation speed of the arms exceeds the amount of increase in the centrifugal force F2 resulting from the acceleration of the head 2. As a result, the force F, especially, the force pulling the human body h10 to the front side, is reduced, so that the swing is stabilized.

As described above, the force F can be reduced by increasing the initial bending. In particular, the force F can be reduced near impact, which is in a phase in which the front-rear direction component of the force F increases. Consequently, the balance of the human body h10 is maintained, swing is stabilized, and the variation in hitting points is suppressed. This effect is also referred to as "swing stabilizing effect".

In addition, even though the rotation speed of the arms near impact is reduced, the head speed is increased. As a result, in addition to the variation in hitting points being suppressed, the head speed is increased. With this club, a flight distance is increased, and the flight distance can be consistently achieved. In other words, the average flight distance is increased.

[2-1. Club Vibration Frequency]

The club vibration frequency is measured for a completed club. The club vibration frequency is a dynamic property, not a static property. Swing is dynamic. The club vibration frequency can accurately reflect behavior of the club during a swing.

In measuring the club vibration frequency, the grip side of the club is fixed, and a load is applied to the head side of the club, thus vibrating the club. This state is similar to the state of the club at the turn from top. Moreover, the club vibration frequency is a dynamic indicator. The club vibration frequency can accurately reflect the dynamic behavior of the club during a swing.

By decreasing the club vibration frequency, the shaft is likely to bend at the turn from top. That is, the initial bending is increased by decreasing the club vibration frequency. As a result, the rotation speed of the arms is increased in the initial stage of downswing, and this rotational energy is transmitted to the club, and a reduction in the rotation speed of the arms and an increase in the head speed are achieved by the reaction force. Accordingly, the transmission efficiency of the energy from the arms to the club is improved, and the force F is decreased, so that the swing is stabilized. A small club vibration frequency enhances the swing stabilizing effect, and contributes to increase in average flight distance.

[2-2. Swing Weight (14-Inch Balance)]

In general, a swing weight is also referred to as a swing balance. The swing weight can be increased by increasing the head weight Wh. The swing weight in the present application is a 14-inch balance.

When the swing weight is large, the head weight Wh tends to be increased. In this case, the kinetic energy of the head is increased, and the initial ball velocity is increased. In addition, when the swing weight is large, the inertia of the head is increased, so that the stationary state of the head at the top is likely to be maintained. As a result, the shaft is likely to bend at the turn from top. By increasing the swing weight, the initial bending can be increased.

Meanwhile, when the swing weight is large, the centrifugal force F2 of the club tends to be increased. In this case, the force F acting on the player's body during the swing can also be increased. As a result, the balance of the human body h10 is disturbed, and the swing is prone to be unstable. However, this problem can be solved by the swing stabilizing effect. Consequently, the kinetic energy of the head is increased while the swing stability is maintained. Furthermore, an increase in the initial bending resulting from the inertia of the head further enhances the swing stabilizing effect. Accordingly, swing is stabilized, the variation in hitting points is reduced, and the initial ball velocity is increased. As a result, the average flight distance can be further increased.

[2-3. Wh/Wc]

A ratio (Wh/Wc) is the proportion of the head weight Wh to the club weight Wc. When the head weight Wh is large, the kinetic energy of the head is increased, and the coefficient of restitution is improved. When the head weight Wh is large, the inertia of the head is increased, and a stationary state of the head at the top is likely to be maintained. As a result, the shaft is likely to bend at the turn from top. By increasing Wh/Wc, the initial bending can be increased.

Meanwhile, when the head weight Wh is large, the centrifugal force F2 of the club is increased, so that the force F acting on the player's body during the swing can also be increased. As a result, the balance of the human body h10 is disturbed, and the swing is prone to be unstable. However, this problem can be solved by the swing stabilizing effect. Consequently, the kinetic energy of the head is increased while the swing stability is maintained. Furthermore, an increase in the initial bending resulting from the inertia of the head further enhances the swing stabilizing effect. Accordingly, swing is stabilized, the variation in hitting points is reduced, and the initial ball velocity is increased. As a result, the average flight distance can be further increased.

[2-4. Club Length Lc]

A large club length Lc is advantageous in that the head speed is increased by an increased radius of rotation of a swing, but is disadvantageous in that the variation in hitting points is increased.

As described above, by decreasing the club vibration frequency, the shaft tends to bend at the turn from top, so that the swing stabilizing effect is achieved. By applying this effect to a long club, the above-described advantage can be utilized while the variation in hitting points, which is the above-described disadvantage, is suppressed. As a result, the head speed is increased, and the average flight distance is increased.

[2-5. Grip Weight Wg]

As described above, in analyzing the force F, the centrifugal forces acting on the club and the arms are taken into consideration. At impact, a substantially straight line is formed by the club and respective portions of the arms as a result of a wrist cock made at the top having been released. At the impact, the center of gravity of the shaft and the center of gravity of the head are located away from the swing axis (the center of the trunk). On the other hand, at the top of a general golf player, the center of gravity of the shaft and the center of gravity of the head are located closer to the swing axis by the wrist cock than those at impact. However, the distance between the center of gravity of the grip and the swing axis is hardly changed. Accordingly, due to the position of the center of gravity of the grip at the top, the grip weight Wg significantly affects the rotation speed of the arms at the turn from top. By reducing the grip weight Wg, the rotation speed of the arms at the turn from top is increased (arm speed increasing effect B).

Meanwhile, when the grip weight Wg is small, the hand-gripped portion is likely to move excessively. Accordingly, behavior of the hand-gripped portion can become unstable. However, the centrifugal force F1 of the arms is decreased by the above-described arm speed reducing effect, so that the behavior of the hand-gripped portion is stabilized. As a result, the swing stabilizing effect is achieved while the instability of the behavior of the hand-gripped portion is eliminated. In addition to the arm speed increasing effect A, the arm speed increasing effect B is achieved. These effects can effectively increase the average flight distance.

[2-6. Shoulder Center Grip GLL]

Figure 4:
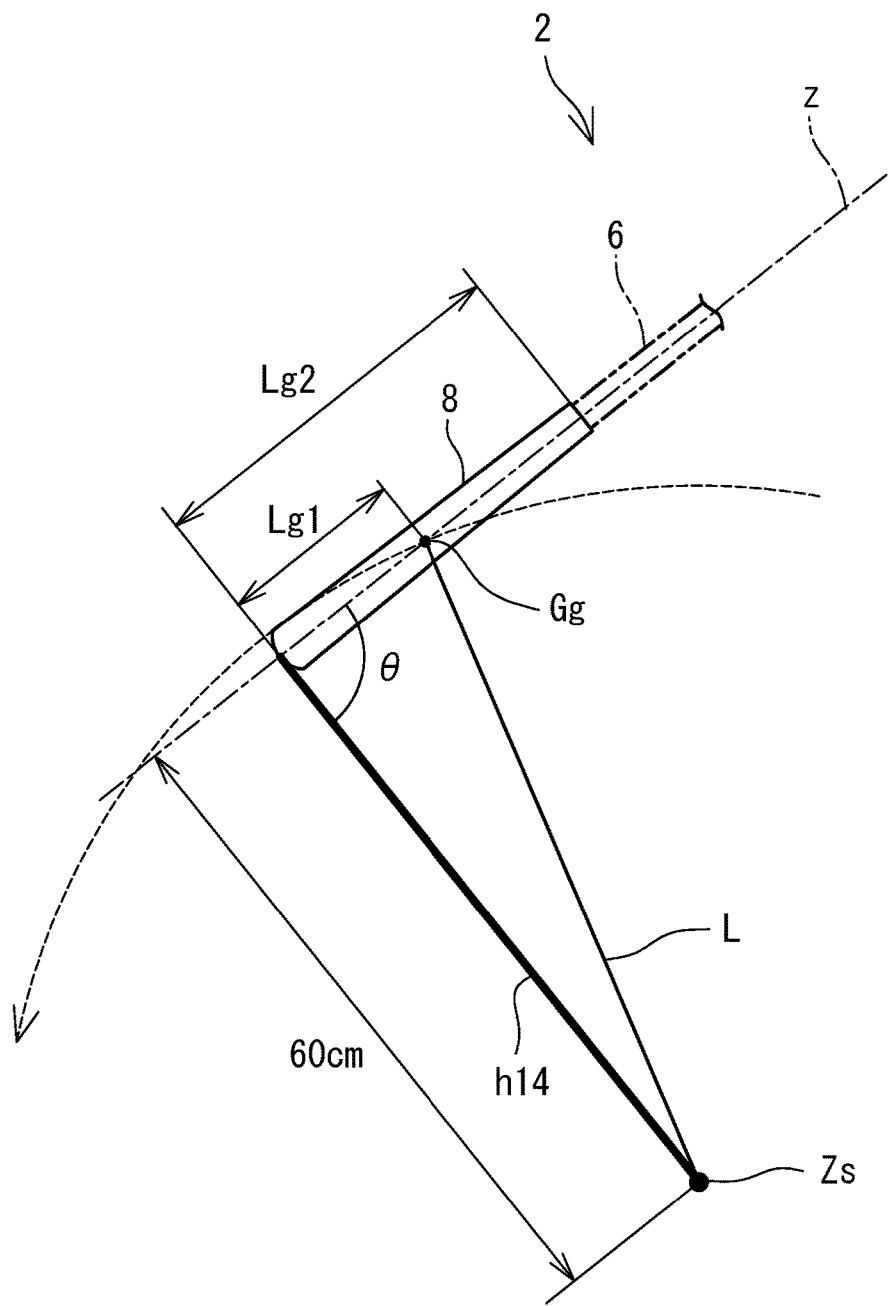
FIG. 4 is a conceptual diagram showing states of arms and the club in the initial stage of downswing.

In the present application, a shoulder center grip GLL is defined. FIG. 4 is a conceptual diagram for illustrating the shoulder center grip GLL.

FIG. 4 is the conceptual diagram showing the left arm h14 and the club 2 in the phase of the turn from top. In a typical swing, an angle θ formed by the left arm h14 and a shaft axis line z of the club 2 is approximately 90° in this phase. The angle θ is formed by the wrist cock. In the phase of the turn, the left arm h14 and the club 2 that form an angle of 90° therebetween rotate about a swing axis Zs (the center between both shoulders).

As an indicator of the dynamic influence of the grip 8 on the rotation at the turn, the shoulder center grip GLL is defined. In calculating the shoulder center grip GLL, the distance between the swing axis Zs and the grip end is set to 60 cm. This distance is based on an average arm length.

The grip 8 has the center of gravity Gg. The center of gravity Gg of the grip is the center of gravity of the grip alone. In the club 2, the center of gravity Gg of the grip is located on the shaft axis line z. A double-ended arrow Lg1 in FIG. 4 indicates a distance between a butt-side end of the grip 8 and the center of gravity Gg of the grip. A double-ended arrow Lg2 in FIG. 4 indicates a full length of the grip 8. Lg1 and Lg2 are measured along the shaft axis line z.

As described above, the angle θ can be 90°. When the unit of the distance Lg1 is centimeters, a distance L (centimeters) between the center of rotation Zs and the center of gravity Gg of the grip is calculated by the Pythagorean theorem as follows.

$$L=[60^2+(Lg1)^2]^{1/2}$$

On the basis of the distance L (centimeters), the shoulder center grip GLL (kg·cm$^2$) is calculated by the following equation:

$$\text{Shoulder center grip } GLL = Wg \times L \times L$$

where Wg is the grip weight (kilograms).

By decreasing the shoulder center grip GLL, the rotation speed in the initial stage of downswing can be increased. Accordingly, the rotation speed of the arms is increased in the first half of the downswing (arm speed increasing effect C). The arm speed increasing effect C can act synergistically with the arm speed increasing effects A and B.

[2-7. Lg1/Lg2; Ratio of Center of Gravity of Grip]

Lg1 represents the distance between the butt-side end of the grip 8 and the center of gravity Gg of the grip. Lg2 represents the full length of the grip 8. By increasing Lg1/Lg2, rotation of the grip 8 about the grip end is suppressed, so that the wrist cock is likely to be maintained in the initial stage of downswing. For this reason, the rotation speed of the arms in the initial stage of downswing can be increased.

As described above, a typical angle θ at the top is approximately 90 degrees. Accordingly, even when Lg1 is increased, L is not increased that much. Therefore, even when Lg1 is increased, the shoulder center grip GLL is not increased that much. As a result, both the effect brought by a large Lg1/Lg2 and the arm speed increasing effect C brought by a small shoulder center grip GLL can be achieved.

[3. Preferable Values]

Preferable values of respective specifications are as follows.

[3-1. Club Vibration Frequency]

From the viewpoint of increasing the initial bending and enhancing the swing stabilizing effect, the club vibration frequency is preferably less than or equal to 230 cpm, more preferably less than or equal to 220 cpm, and still more preferably less than or equal to 210 cpm. When the club vibration frequency is excessively small, bending return may become insufficient. From this viewpoint, the club vibration frequency is preferably greater than or equal to 150 cpm, more preferably greater than or equal to 160 cpm, and still more preferably greater than or equal to 170 cpm.

[3-2. Swing Weight (14-Inch Balance)]

From the viewpoint of increasing the swing stabilizing effect and increasing the coefficient of restitution, the swing weight is preferably greater than or equal to D2, more preferably greater than or equal to D3, even more preferably greater than or equal to D4, and still more preferably greater than or equal to D5. In view of ease of swing, the swing weight is preferably less than or equal to E5, more preferably less than or equal to E3, and still more preferably less than or equal to E1.

[3-3. Wh/Wc]

From the viewpoint of increasing the swing stabilizing effect and increasing the coefficient of restitution, the ratio (Wh/Wc) is preferably greater than or equal to 0.70, more preferably greater than or equal to 0.71, and still more preferably greater than or equal to 0.72. In view of ease of swing, an excessively large head weight Wh is not preferable. From this viewpoint, the ratio (Wh/Wc) is preferably less than or equal to 0.82, more preferably less than or equal to 0.81, and still more preferably less than or equal to 0.80.

[3-4. Club Length Lc]

From the viewpoint of increasing the swing stabilizing effect and increasing the head speed, the club length Lc is preferably greater than or equal to 45.5 inches, more preferably greater than or equal to 45.7 inches, and still more preferably greater than or equal to 46.0 inches. In view of ease of swing, the club length Lc is preferably less than or equal to 48 inches, more preferably less than or equal to 47.5 inches, and still more preferably less than or equal to 47 inches.

[3-5. Grip Weight Wg]

From the viewpoint of the swing stabilizing effect and the arm speed increasing effect B, the grip weight Wg is preferably less than or equal to 36 g, more preferably less than or equal to 34 g, even more preferably less than or equal to 30 g, and still more preferably less than or equal to 28 g. In view of the grip strength, the grip weight Wg is preferably greater than or equal to 15 g, more preferably greater than or equal to 17 g, and still more preferably greater than or equal to 19 g.

[3-6. Shoulder Center Grip GLL]

By decreasing the shoulder center grip GLL, the rotation speed in the initial stage of downswing can be increased, so that the arm speed increasing effect C is achieved. From this viewpoint, the shoulder center grip GLL is preferably less than or equal to 140 kg·cm$^2$, more preferably less than or equal to 130 kg·cm$^2$, even more preferably less than or equal to 120 kg·cm$^2$, and still more preferably less than or equal to 110 kg·cm$^2$. In light of restriction on design, the shoulder center grip GLL is preferably greater than or equal to 60 kg·cm$^2$, more preferably greater than or equal to 70 kg·cm$^2$, and still more preferably greater than or equal to 80 kg·cm$^2$.

[3-7. Lg1/Lg2; Ratio of Center of Gravity of Grip]

By increasing Lg1/Lg2, the rotation of the grip 8 about the grip end is suppressed, and the wrist cock is likely to be maintained in the initial stage of downswing. By this maintenance, the path of the head 4 in the initial stage of the downswing approaches the swing axis, thereby further enhancing the arm speed increasing effect A. From this viewpoint, Lg1/Lg2 is preferably greater than or equal to 0.37, more preferably greater than or equal to 0.38, even more preferably greater than or equal to 0.39, and still more preferably greater than or equal to 0.40. In light of restriction on design, Lg1/Lg2 is preferably less than or equal to 0.52, more preferably less than or equal to 0.50, and still more preferably less than or equal to 0.48.

The method for adjusting Lg1 is not limited, and examples thereof include the following.

(a) Adjusting the wall thickness distribution of the grip.

(b) Using a plurality of types of rubbers having different specific gravities, and adjusting the arrangement thereof.

(c) Using a plurality of types of rubbers having different expansion ratios, and adjusting the arrangement thereof.

[4. Measurement Method]

The measurement methods for the respective specifications are as follows.

[4-1. Club Length Lc]

The club length Lc in the present application is measured in compliance with the rules announced by the R&A (Royal and Ancient Golf Club of Saint Andrews). The rules are described in "1c Length" in "1. Clubs" of "Appendix II Design of Clubs" in the latest Golf Rules issued by the R&A. As shown in FIG. 1, in the measurement of the club length Lc, the sole is abutted on a plane having an angle of 60° with respect to a club placement plane Pc. The club length Lc is a distance between the butt end of the club and an intersection line of the 60° plane and the club placement plane Pc. The club placement plane Pc is horizontal in an actual measurement.

[4-2. Club Vibration Frequency]

Figure 5:
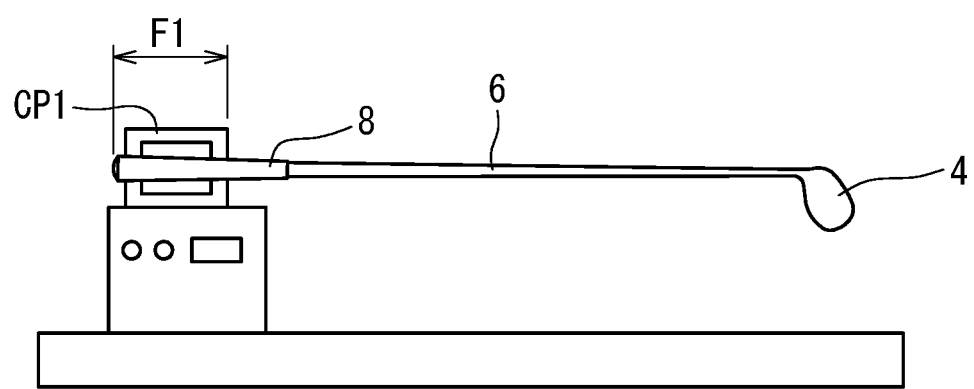
FIG. 5 is a schematic diagram illustrating a measurement method for a club vibration frequency.

FIG. 5 shows the club 2 fixed to a measurement instrument for the club vibration frequency. For the club vibration frequency measurement, trade name "GOLF CLUB TIMING HARMONIZER" manufactured by Fujikura Rubber Ltd. is used. As shown in FIG. 5, a portion between the grip end and a point separated by 7 inches from the grip end is fixed by a clamp CP1. That is, the length F1 of the fixed portion is 7 inches (approximately 178 mm). A given load is applied downward to the head 4, thus vibrating the shaft 6. The number of vibrations per minute is the club vibration frequency (cpm).

[4-3. Swing Weight (14-Inch Balance)]

The swing weight is measured using trade name "BANCER-14" manufactured by DAININ Corporation. The swing weight is a 14-inch balance.

The swing weight is expressed by a symbol that is a combination of one letter of the alphabet with a numeral. The letter of the alphabet is one of A to F. The numerical value is an integer of 0 to 9. Note that the first decimal place of the numerical value is rounded off. For the swing weight, a position spaced apart by 14 inches from the grip end is set as a fulcrum. The swing weight is determined based on a numerical value obtained by multiplying the axial-direction distance (inches) from the fulcrum to the center of gravity of the club by the club weight (ounces). The numerical value is classified into six levels A to F. Furthermore, each of the levels A to F is narrowly classified using the numerical values of 0 to 9. The swing weight increases in an ascending alphabetical order, i.e., A to F, meaning that the higher the numerical value, the larger the swing weight.

[5. Other Specifications]

Other preferable specifications are as follows.

[5-1. Head Weight Wh]

From the viewpoint of the initial bending and the coefficient of restitution, the head weight Wh is preferably greater than or equal to 188 g, more preferably greater than or equal to 190 g, and even more preferably greater than or equal to 192 g. From the viewpoint of ease of swing, the head weight Wh is preferably less than or equal to 210 g, more preferably less than or equal to 207 g, and even more preferably less than or equal to 205 g.

[5-2. Shaft Weight Ws]

From the viewpoint of increasing ease of swing while increasing the ratio (Wh/Wc), the shaft weight Ws is preferably smaller. From the viewpoint of an increase in the initial bending and ease of swing, the shaft weight Ws is preferably less than 50 g, more preferably less than or equal to 48 g, even more preferably less than or equal to 46 g, still more preferably less than or equal to 44 g, and yet more preferably less than or equal to 43 g. From the viewpoint of the strength and the durability of the shaft, the shaft weight Ws is preferably greater than or equal to 33 g, more preferably greater than or equal to 35 g, and even more preferably greater than or equal to 37 g.

[5-3. Lf1/Lf2: Ratio of Center of Gravity of Shaft]

As described above, the distance Lf1 is the distance between the butt end Bt of the shaft 6 and the center of gravity Gs of the shaft, and the distance Lf2 is the full length of the shaft 6. Lf1 and Lf2 are distances in the axial direction.

In order to increase ease of swing even when Wh/Wc is increased, Lf1/Lf2 is preferably smaller. From the viewpoint of achieving both increased initial bending and ease of swing, Lf1/Lf2 is preferably less than or equal to 0.46, more preferably less than or equal to 0.45, and even more preferably less than or equal to 0.44. In light of restriction on design, Lf1/Lf2 is preferably greater than or equal to 0.33, more preferably greater than or equal to 0.34, and even more preferably greater than or equal to 0.35.

[5-4. Club Number]

There is a tendency that the longer the club, the greater the importance placed on the flight distance performance. For a driver, the variation in hitting points increases with an increase in the club length. From this viewpoint, a wood type club is preferable, and a driver is particularly preferable. Particularly preferably, the real loft of the driver is normally greater than or equal to 7° and less than or equal to 15°. The volume of the head is preferably greater than or equal to 350 cc, more preferably greater than or equal to 380 cc, even more preferably greater than or equal to 400 cc, and still more preferably greater than or equal to 420 cc. From the viewpoint of the head strength, the volume of the head is preferably less than or equal to 470 cc.

[5-5. Club Weight Wc]

From the viewpoint of ease of swing, the club weight Wc is preferably less than or equal to 290 g, more preferably less than or equal to 280 g, even more preferably less than or equal to 275 g, and still more preferably less than or equal to 272 g. In view of the club strength, the club weight Wc is preferably greater than or equal to 230 g, more preferably greater than or equal to 240 g, and even more preferably greater than or equal to 245 g.

EXAMPLES

Hereinafter, the effects of the present disclosure will be clarified by examples. However, the present disclosure should not be interpreted in a limited way based on the description of the examples.

[Sample 1]

A forged face member and a casted body member were welded, to obtain a driver head made of a titanium alloy. Using a plurality of prepreg sheets, a shaft was obtained by the sheet winding method. A rubber composition was heated and pressed in a mold to obtain a grip. In forming the grip, three types of rubbers having different expansion ratios were used. A first rubber having a relatively low expansion ratio was used for an outer layer over the full length of the grip. A second rubber having a relatively high expansion ratio was used for an inner layer over the full length of the grip. Further, an un-foamed third rubber was used only for the tip portion of the grip. The head, the shaft, and the grip were assembled to obtain a golf club sample 1. The specifications and the evaluation results of the sample 1 are shown in Table 3 below.

[Samples 2 to 26]

Golf club samples 2 to 26 were obtained in the same manner as the sample 1 except for the specifications shown in Tables 3 to 8 below.

The head weight Wh was adjusted by placing an adhesive inside the head. The adhesive was used by adhering the adhesive to the inner surface of the head. The adhesive is thermoplastic, and is adhered at a predetermined position on the inner surface of the head at room temperature and flows at a high temperature. The adhesive was heated to a high temperature, poured into the head, and thereafter cooled to room temperature so as to be fixed. The adhesive was disposed so as not to change the position of the center of gravity of the head.

The shaft specifications such as the club vibration frequency were adjusted by the laminate design of the prepreg sheets and the prepreg materials. Tables 1 and 2 below show examples of utilizable prepreg sheets. By appropriately selecting these various types of sheets, the shaft specifications can be readily adjusted. In addition, the club vibration frequency and Lf1/Lf2 can be adjusted by appropriately using a butt partial layer and a tip partial layer.

TABLE 1

Examples of Utilizable Prepregs

| Manufacturer | Trade name | Sheet thickness (mm) | Fiber content (% by weight) | Resin content (% by weight) | Fiber product No. | Tensile elastic modulus (t/mm$^2$) | Tensile strength (kgf/mm$^2$) |
|---|---|---|---|---|---|---|---|
| Toray Industries, Inc. | 3255S-10 | 0.082 | 76 | 24 | T700S | 24 | 500 |
| Toray Industries, Inc. | 3255S-12 | 0.103 | 76 | 24 | T700S | 24 | 500 |
| Toray Industries, Inc. | 3255S-15 | 0.123 | 76 | 24 | T700S | 24 | 500 |
| Toray Industries, Inc. | 2255S-10 | 0.082 | 76 | 24 | T800S | 30 | 600 |
| Toray Industries, Inc. | 2255S-12 | 0.102 | 76 | 24 | T800S | 30 | 600 |
| Toray Industries, Inc. | 2255S-15 | 0.123 | 76 | 24 | T800S | 30 | 600 |
| Toray Industries, Inc. | 2256S-10 | 0.077 | 80 | 20 | T800S | 30 | 600 |
| Toray Industries, Inc. | 2256S-12 | 0.103 | 80 | 20 | T800S | 30 | 600 |
| Toray Industries, Inc. | 2276S-10 | 0.077 | 80 | 20 | T800S | 30 | 600 |
| Toray Industries, Inc. | 805S-3 | 0.034 | 60 | 40 | M30S | 30 | 560 |
| Toray Industries, Inc. | 8053S-3 | 0.028 | 70 | 30 | M30S | 30 | 560 |
| Toray Industries, Inc. | 9255S-7A | 0.056 | 78 | 22 | M40S | 40 | 470 |
| Toray Industries, Inc. | 9255S-6A | 0.047 | 76 | 24 | M40S | 40 | 470 |
| Toray Industries, Inc. | 925AS-4C | 0.038 | 65 | 35 | M40S | 40 | 470 |
| Toray Industries, Inc. | 9053S-4 | 0.027 | 70 | 30 | M40S | 40 | 470 |
| Nippon Graphite Fiber Co., Ltd. | E1026A-09N | 0.100 | 63 | 37 | XN-10 | 10 | 190 |
| Nippon Graphite Fiber Co., Ltd. | E1026A-14N | 0.150 | 63 | 37 | XN-10 | 10 | 190 |

The tensile strength and the tensile elastic modulus are values measured in compliance with JIS R7601: 1986 "Testing methods for carbon fibers".

TABLE 2

Examples of Utilizable Prepregs

| Manufacturer | Trade name | Sheet thickness (mm) | Fiber content (% by weight) | Resin content (% by weight) | Fiber product No. | Tensile elastic modulus (t/mm$^2$) | Tensile strength (kgf/mm$^2$) |
|---|---|---|---|---|---|---|---|
| Mitsubishi Rayon Co., Ltd. | GE352H-160S | 0.150 | 65 | 35 | E Glass | 7 | 320 |
| Mitsubishi Rayon Co., Ltd. | TR350C-100S | 0.083 | 75 | 25 | TR50S | 24 | 500 |

TABLE 2-continued

Examples of Utilizable Prepregs

| Manufacturer | Trade name | Sheet thickness (mm) | Fiber content (% by weight) | Resin content (% by weight) | Fiber product No. | Physical property value of reinforcement fiber | |
|---|---|---|---|---|---|---|---|
| | | | | | | Tensile elastic modulus (t/mm$^2$) | Tensile strength (kgf/mm$^2$) |
| Mitsubishi Rayon Co., Ltd. | TR350U-100S | 0.078 | 75 | 25 | TR50S | 24 | 500 |
| Mitsubishi Rayon Co., Ltd. | TR350C-125S | 0.104 | 75 | 25 | TR50S | 24 | 500 |
| Mitsubishi Rayon Co., Ltd. | TR350C-150S | 0.124 | 75 | 25 | TR50S | 24 | 500 |
| Mitsubishi Rayon Co., Ltd. | TR350C-175S | 0.147 | 75 | 25 | TR50S | 24 | 500 |
| Mitsubishi Rayon Co., Ltd. | MR350J-025S | 0.034 | 63 | 37 | MR40 | 30 | 450 |
| Mitsubishi Rayon Co., Ltd. | MR350J-050S | 0.058 | 63 | 37 | MR40 | 30 | 450 |
| Mitsubishi Rayon Co., Ltd. | MR350C-050S | 0.05 | 75 | 25 | MR40 | 30 | 450 |
| Mitsubishi Rayon Co., Ltd. | MR350C-075S | 0.063 | 75 | 25 | MR40 | 30 | 450 |
| Mitsubishi Rayon Co., Ltd. | MRX350C-075R | 0.063 | 75 | 25 | MR40 | 30 | 450 |
| Mitsubishi Rayon Co., Ltd. | MRX350C-100S | 0.085 | 75 | 25 | MR40 | 30 | 450 |
| Mitsubishi Rayon Co., Ltd. | MR350C-100S | 0.085 | 75 | 25 | MR40 | 30 | 450 |
| Mitsubishi Rayon Co., Ltd. | MRX350C-125S | 0.105 | 75 | 25 | MR40 | 30 | 450 |
| Mitsubishi Rayon Co., Ltd. | MR350C-125S | 0.105 | 75 | 25 | MR40 | 30 | 450 |
| Mitsubishi Rayon Co., Ltd. | MR350E-100S | 0.093 | 70 | 30 | MR40 | 30 | 450 |
| Mitsubishi Rayon Co., Ltd. | HRX350C-075S | 0.057 | 75 | 25 | HR40 | 40 | 450 |
| Mitsubishi Rayon Co., Ltd. | HRX350C-110S | 0.082 | 75 | 25 | HR40 | 40 | 450 |

The tensile strength and the tensile elastic modulus are values measured in compliance with JIS R7601: 1986 "Testing methods for carbon fibers".

The grip specifications such as the grip weight Wg were adjusted by the volume ratio and the arrangement of a plurality of types of rubbers having different expansion ratios. The third rubber (un-foamed rubber) is useful for adjustment of the distance Lg1 since it has a relatively large specific gravity and is disposed locally.

The specifications and the evaluation results of the respective samples are shown in Tables 3 to 8 below. The measurement methods for the respective specifications are as described above.

[Evaluation Method]
The evaluation method is as follows.
[Head Speed]
Ten test players with a handicap of 0 to 20 carried out an actual hitting test. Each test player hit five balls with each club, and the head speed and the hitting point were measured for each of the hits. The average values of 50 pieces of data are shown in the tables below.

[Standard Deviation of Hitting Points]
In the actual hitting test, the hitting points were measured together with the head speed. The hitting points were measured using a shot marker (impact marker). The shot marker was attached to the face surface of the head, and the positions of hitting marks on the face surface were measured. The distance (displacement distance) of each hitting point from the face center was measured. The displacement distance (mm) in the left-right direction and the displacement distance (mm) in the up-down direction were measured. The left-right direction means the toe-heel direction. The up-down direction means the top-sole direction. The standard deviations of the hitting points in the left-right direction and the hitting points in the up-down direction are shown in the tables below.

The hitting points can be measured highly accurately, and thus are useful as an indicator for accurately detecting the variation in swing. That is, the hitting points are effective for accurately detecting swing stability.

TABLE 3

Specifications and Evaluation Results of Samples

| | Unit | Sample 1 | Sample 2 | Sample 3 | Sample 4 | Sample 5 |
|---|---|---|---|---|---|---|
| Club length Lc (R&A rule) | inch | 46.5 | 46.5 | 46.5 | 46.5 | 46.5 |
| Head weight Wh | g | 195 | 195 | 195 | 195 | 195 |

TABLE 3-continued

Specifications and Evaluation Results of Samples

|  | Unit | Sample 1 | Sample 2 | Sample 3 | Sample 4 | Sample 5 |
|---|---|---|---|---|---|---|
| Shaft weight Ws | g | 42 | 42 | 42 | 42 | 42 |
| Grip weight Wg | g | 28 | 28 | 28 | 28 | 28 |
| Club weight Wc | g | 271 | 271 | 271 | 271 | 271 |
| Wh/Wc | — | 0.72 | 0.72 | 0.72 | 0.72 | 0.72 |
| Club vibration frequency | cpm | 190 | 200 | 210 | 220 | 230 |
| Swing weight (14-inch balance method) | — | D5 | D5 | D5 | D5 | D5 |
| Lf1/Lf2 | — | 0.44 | 0.44 | 0.44 | 0.44 | 0.44 |
| Lg1 | mm | 109 | 109 | 109 | 109 | 109 |
| Lg1/Lg2 | — | 0.41 | 0.41 | 0.41 | 0.41 | 0.41 |
| Shoulder center grip GLL | kg·cm$^2$ | 104 | 104 | 104 | 104 | 104 |
| Head speed | m/s | 37.2 | 37.1 | 37.0 | 36.9 | 36.8 |
| Standard deviation of hitting points in left-right direction | — | 5.9 | 7.3 | 8.6 | 9.9 | 11.3 |
| Standard deviation of hitting points in up-down direction | — | 2.4 | 4.9 | 7.5 | 10.1 | 12.6 |

TABLE 4

Specifications and Evaluation Results of Samples

|  | Unit | Sample 6 | Sample 7 | Sample 8 | Sample 3 | Sample 9 |
|---|---|---|---|---|---|---|
| Club length Lc (R&A rule) | inch | 46.5 | 46.5 | 46.5 | 46.5 | 46.5 |
| Head weight Wh | g | 188 | 191 | 194 | 195 | 198 |
| Shaft weight Ws | g | 42 | 42 | 42 | 42 | 42 |
| Grip weight Wg | g | 28 | 28 | 28 | 28 | 28 |
| Club weight Wc | g | 264 | 267 | 270 | 271 | 274 |
| Wh/Wc | — | 0.71 | 0.72 | 0.72 | 0.72 | 0.72 |
| Club vibration frequency | cpm | 210 | 210 | 210 | 210 | 210 |
| Swing weight (14-inch balance method) | — | D0 | D2 | D4 | D5 | D7 |
| Lf1/Lf2 | — | 0.44 | 0.44 | 0.44 | 0.44 | 0.44 |
| Lg1 | mm | 109 | 109 | 109 | 109 | 109 |
| Lg1/Lg2 | — | 0.41 | 0.41 | 0.41 | 0.41 | 0.41 |
| Shoulder center grip GLL | kg·cm$^2$ | 104 | 104 | 104 | 104 | 104 |
| Head speed | m/s | 37.5 | 37.4 | 37.1 | 37.0 | 36.8 |
| Standard deviation of hitting points in left-right direction | — | 9.8 | 9.3 | 8.8 | 8.6 | 8.1 |
| Standard deviation of hitting points in up-down direction | — | 9.7 | 8.8 | 7.8 | 7.5 | 6.6 |

TABLE 5

Specifications and Evaluation Results of Samples

|  | Unit | Sample 10 | Sample 11 | Sample 3 | Sample 12 | Sample 13 |
|---|---|---|---|---|---|---|
| Club length Lc (R&A rule) | inch | 46.5 | 46.5 | 46.5 | 46.5 | 46.5 |
| Head weight Wh | g | 196 | 195 | 195 | 195 | 196 |
| Shaft weight Ws | g | 43 | 42 | 42 | 40 | 37 |

TABLE 5-continued

Specifications and Evaluation Results of Samples

|  | Unit | Sample 10 | Sample 11 | Sample 3 | Sample 12 | Sample 13 |
|---|---|---|---|---|---|---|
| Grip weight Wg | g | 25 | 27 | 28 | 30 | 34 |
| Club weight Wc | g | 270 | 270 | 271 | 271 | 273 |
| Wh/Wc | — | 0.73 | 0.72 | 0.72 | 0.72 | 0.72 |
| Club vibration frequency | cpm | 210 | 210 | 210 | 210 | 210 |
| Swing weight (14-inch balance method) | — | D6 | D5 | D5 | D4 | D4 |
| Lf1/Lf2 | — | 0.44 | 0.44 | 0.44 | 0.44 | 0.44 |
| Lg1 | mm | 109 | 109 | 109 | 109 | 109 |
| Lg1/Lg2 | — | 0.41 | 0.41 | 0.41 | 0.41 | 0.41 |
| Shoulder center grip GLL | kg · cm$^2$ | 93 | 100 | 104 | 112 | 126 |
| Head speed | m/s | 37.1 | 37.0 | 37.0 | 36.9 | 36.8 |
| Standard deviation of hitting points in left-right direction | — | 8.4 | 8.6 | 8.6 | 8.7 | 8.8 |
| Standard deviation of hitting points in up-down direction | — | 7.3 | 7.4 | 7.5 | 7.5 | 7.7 |

TABLE 6

Specifications and Evaluation Results of Samples

|  | Unit | Sample 14 | Sample 15 | Sample 16 | Sample 17 | Sample 18 |
|---|---|---|---|---|---|---|
| Club length Lc (R&A rule) | inch | 45.5 | 45.7 | 46.0 | 46.5 | 47.0 |
| Head weight Wh | g | 195 | 195 | 195 | 195 | 195 |
| Shaft weight Ws | g | 42 | 42 | 42 | 42 | 42 |
| Grip weight Wg | g | 28 | 28 | 28 | 28 | 28 |
| Club weight Wc | g | 271 | 271 | 271 | 271 | 271 |
| Wh/Wc | — | 0.72 | 0.72 | 0.72 | 0.72 | 0.72 |
| Club vibration frequency | cpm | 215 | 210 | 205 | 200 | 195 |
| Swing weight (14-inch balance method) | — | D1 | D2 | D3 | D5 | D7 |
| Lf1/Lf2 | — | 0.44 | 0.44 | 0.44 | 0.44 | 0.44 |
| Lg1 | mm | 109 | 109 | 109 | 109 | 109 |
| Lg1/Lg2 | — | 0.41 | 0.41 | 0.41 | 0.41 | 0.41 |
| Shoulder center grip GLL | kg · cm$^2$ | 104 | 104 | 104 | 104 | 104 |
| Head speed | m/s | 36.1 | 36.5 | 36.7 | 37.1 | 37.1 |
| Standard deviation of hitting points in left-right direction | — | 9.5 | 8.8 | 8.1 | 7.3 | 8.8 |
| Standard deviation of hitting points in up-down direction | — | 9.3 | 7.8 | 6.5 | 4.9 | 7.7 |

TABLE 7

Specifications and Evaluation Results of Samples

|  | Unit | Sample 19 | Sample 20 | Sample 21 | Sample 3 | Sample 22 |
|---|---|---|---|---|---|---|
| Club length Lc (R&A rule) | inch | 46.5 | 46.5 | 46.5 | 46.5 | 46.5 |
| Head weight Wh | g | 195 | 195 | 195 | 195 | 195 |
| Shaft weight Ws | g | 42 | 42 | 42 | 42 | 42 |
| Grip weight Wg | g | 28 | 28 | 28 | 28 | 28 |

TABLE 7-continued

Specifications and Evaluation Results of Samples

| | Unit | Sample 19 | Sample 20 | Sample 21 | Sample 3 | Sample 22 |
|---|---|---|---|---|---|---|
| Club weight Wc | g | 271 | 271 | 271 | 271 | 271 |
| Wh/Wc | — | 0.72 | 0.72 | 0.72 | 0.72 | 0.72 |
| Club vibration frequency | cpm | 210 | 210 | 210 | 210 | 210 |
| Swing weight (14-inch balance method) | — | D5 | D5 | D5 | D5 | D5 |
| Lf1/Lf2 | — | 0.44 | 0.44 | 0.44 | 0.44 | 0.44 |
| Lg1 | mm | 98 | 101 | 106 | 109 | 114 |
| Lg1/Lg2 | — | 0.37 | 0.38 | 0.40 | 0.41 | 0.43 |
| Shoulder center grip GLL | kg·cm$^2$ | 103 | 104 | 104 | 104 | 104 |
| Head speed | m/s | 36.8 | 36.9 | 36.9 | 37.0 | 37.1 |
| Standard deviation of hitting points in left-right direction | — | 8.9 | 8.8 | 8.7 | 8.6 | 8.5 |
| Standard deviation of hitting points in up-down direction | — | 8.0 | 7.8 | 7.6 | 7.5 | 7.4 |

TABLE 8

Specifications and Evaluation Results of Samples

| | Unit | Sample 23 | Sample 24 | Sample 3 | Sample 25 | Sample 26 |
|---|---|---|---|---|---|---|
| Club length Lc (R&A rule) | inch | 46.5 | 46.5 | 46.5 | 46.5 | 46.5 |
| Head weight Wh | g | 189 | 194 | 195 | 198 | 200 |
| Shaft weight Ws | g | 48 | 44 | 42 | 39 | 38 |
| Grip weight Wg | g | 28 | 28 | 28 | 28 | 28 |
| Club weight Wc | g | 271 | 272 | 271 | 271 | 272 |
| Wh/Wc | — | 0.70 | 0.71 | 0.72 | 0.73 | 0.74 |
| Club vibration frequency | cpm | 213 | 210 | 210 | 208 | 207 |
| Swing weight (14-inch balance method) | — | D2 | D4 | D5 | D7 | D8 |
| Lf1/Lf2 | — | 0.44 | 0.44 | 0.44 | 0.44 | 0.44 |
| Lg1 | mm | 109 | 109 | 109 | 109 | 109 |
| Lg1/Lg2 | — | 0.41 | 0.41 | 0.41 | 0.41 | 0.41 |
| Shoulder center grip GLL | kg·cm$^2$ | 104 | 104 | 104 | 104 | 104 |
| Head speed | m/s | 37.3 | 37.0 | 37.0 | 36.8 | 36.7 |
| Standard deviation of hitting points in left-right direction | — | 9.7 | 8.7 | 8.6 | 8.0 | 7.6 |
| Standard deviation of hitting points in up-down direction | — | 9.5 | 7.7 | 7.5 | 6.4 | 5.6 |

In Table 3, the club vibration frequency is varied. As shown in Table 3, results indicating that the samples with a smaller club vibration frequency had less variation in hitting points were obtained. That is, the tendency that the variation in hitting points was suppressed by decreasing the club vibration frequency was confirmed. This result demonstrates that a small club vibration frequency contributes to swing stability. In addition, the head speed was also increased by decreasing the club vibration frequency.

In Table 4, the swing weight is varied. It was confirmed that, when the club vibration frequency is small, the variation in hitting points tends to be suppressed with a larger swing weight. The head speed was not reduced, despite an increase in the swing weight.

In Table 5, the grip weight Wg is varied. It was confirmed that, when the grip weight Wg is smaller, the variation in hitting points tends to be suppressed and the head speed tends to be higher.

In addition, the shoulder center grip GLL is varied in Table 5. It was confirmed that, when the shoulder center grip GLL is smaller, the variation in hitting points tends to be suppressed and the head speed tends to be higher.

In Table 6, the club length is varied. Normally, with an increase in the club length, the head speed is increased, but the variation in hitting points tends to be increased. However, it was confirmed that, by decreasing the club vibration frequency, the variation in hitting points is not increased even when the club length is increased as long as the club length is within a predetermined club length range.

In Table 7, Lg1/Lg2 is varied. It was confirmed that, when Lg1/Lg2 is larger, the variation in hitting points tends to be suppressed and the head speed tends to be higher.

In Table 8, the ratio (Wh/Wc) is varied. It was confirmed that the variation in hitting points tends to be suppressed when the ratio (Wh/Wc) is larger.

As indicated by these evaluation results, advantages of the present disclosure are clear.

The golf club described above is applicable to all golf clubs such as a wood type golf club, a utility (hybrid) type golf club, and an iron type golf club.

The above descriptions are merely illustrative examples, and various modifications can be made.

What is claimed is:

1. A golf club comprising:
a head;
a shaft; and
a grip, wherein
a club vibration frequency is less than or equal to 210 cpm,
a swing weight is greater than or equal to D5, and
when a distance between a butt-side end of the grip and a center of gravity of the grip is denoted by Lg1, and a length of the grip is denoted by Lg2, Lg1/Lg2 is greater than or equal to 0.37.

2. The golf club according to claim 1, wherein a grip weight Wg is less than or equal to 30 g.

3. The golf club according to claim 1, wherein, when a weight of the head is denoted by Wh, and a weight of the club is denoted by Wc, Wh/Wc is greater than or equal to 0.72.

4. The golf club according to claim 1, wherein a club length is greater than or equal to 45.7 inches and less than or equal to 46.5 inches.

5. The golf club according to claim 1, wherein a shaft weight Ws is less than 50 g.

6. The golf club according to claim 1, wherein a shaft weight Ws is less than or equal to 43 g.

7. The golf club according to claim 1, wherein a club weight Wc is less than or equal to 290 g.

8. The golf club according to claim 1, wherein a club weight Wc is less than or equal to 272 g.

9. A golf club comprising:
a head;
a shaft; and
a grip, wherein
a club vibration frequency is less than or equal to 210 cpm,
a swing weight is greater than or equal to D5,
a shoulder center grip GLL calculated by Equation (1) below is less than or equal to 140 kg·cm$^2$:

$$\text{Shoulder center grip } GLL = Wg \times L \times L \quad (1),$$

Wg is a weight (kg) of the grip, and L is a value calculated by Equation (2) below:

$$L = [60^2 + (Lg1)^2]^{1/2} \quad (2), \text{ and}$$

Lg1 is a distance (cm) between a butt-side end of the grip and a center of gravity of the grip.

10. A golf club comprising:
a head;
a shaft; and
a grip, wherein
a club vibration frequency is less than or equal to 210 cpm,
a swing weight is greater than or equal to D5, and
when a distance between a butt end of the shaft and a center of gravity of the shaft is denoted by Lf1, and a full length of the shaft is denoted by Lf2, Lf1/Lf2 is less than or equal to 0.46.

11. A golf club comprising:
a head;
a shaft; and
a grip, wherein
a club vibration frequency is less than or equal to 210 cpm,
a swing weight is greater than or equal to D5, and
when a distance between a butt end of the shaft and a center of gravity of the shaft is denoted by Lf1, and a full length of the shaft is denoted by Lf2, Lf1/Lf2 is less than or equal to 0.44.

* * * * *